United States Patent [19]

Roy et al.

[11] 4,299,134

[45] Nov. 10, 1981

[54] RESILIENT MECHANISM FOR SHIFTING GEARS

[75] Inventors: Richard H. Roy; Douglas F. Edwards, both of Mt. Vernon, Ohio

[73] Assignee: The J. B. Foote Foundry Co., Fredericktown, Ohio

[21] Appl. No.: 98,648

[22] Filed: Nov. 29, 1979

[51] Int. Cl.³ ............................................. G05G 9/16
[52] U.S. Cl. .................................. 74/473 R; 74/470; 74/701; 192/109 A; 267/155; 403/120
[58] Field of Search ...................... 74/339, 470, 473 R, 74/701; 403/120; 267/155; 192/109 A

[56] References Cited

U.S. PATENT DOCUMENTS

| | | | |
|---|---|---|---|
| 1,222,971 | 4/1917 | Moe | 403/120 |
| 1,594,571 | 8/1926 | Sleeper | 74/470 |
| 1,633,695 | 6/1927 | Colley | 403/120 |
| 2,621,533 | 12/1952 | Schotz | 74/470 X |
| 2,754,692 | 7/1956 | Russell | 74/470 X |
| 4,170,149 | 10/1979 | Koegel | 74/470 X |

Primary Examiner—Allan D. Herrmann
Attorney, Agent, or Firm—Allen D. Gutchess, Jr.

[57] ABSTRACT

Resilient shift mechanism for shifting gears in a transaxle, transmission, gear box, or the like is provided. In a gear drive for a small vehicle such as a garden tractor or a self-propelled lawn mower, it is often difficult to disengage a shift dog from a gear when under a heavy load. In some instances, the shift mechanism, such as a shifter fork, can be distorted, bent, or broken. The new shift mechanism includes a shifter fork for moving a shift dog or clutch collar and a resilient shift lever for moving the shifter fork. The lever has a resilient leg which yields when the shift lever attempts to move the shift dog while the transmission is under a heavy load. The resilient shift lever, being stressed, will subsequently shift the shift dog when the load has diminished.

5 Claims, 6 Drawing Figures

RESILIENT MECHANISM FOR SHIFTING GEARS

This invention relates to a resilient shift mechanism for shifting a shift dog or the like into and out of engagement with a gear or the like.

Particularly when under a heavy load, it is frequently difficult to disengage a shift dog from a gear in a riding lawn mower or a garden tractor, for example, such as when traveling up hill. Under these circumstances, the shifter fork can be distorted, bent, or broken if enough force is placed on the shift lever. The shift lever itself might also be similarly damaged.

The present invention provides a resilient shift mechanism for yielding and not moving the shift dog out of engagement when under a heavy load or other conditions requiring high torque. Preferably, the shift mechanism includes a shift lever having a resilient portion or leg. When the shift lever is shifted to another position and the load is too great to allow the shift dog or clutch collar to disengage from the gear, the lever simply yields and the clutch collar is not moved. When the load diminishes and the torque decreases, the shift lever will then, being in a stressed condition, move the shift dog by the shifter fork out of the engaged position.

It is, therefore, a principal object of the invention to provide resilient shift mechanism for preventing damage when an attempt is made to disengage a shift dog from a gear under high torque conditions.

Many other objects and advantages of the invention will be apparent from the following detailed description of a preferred embodiment thereof, reference being made to the accompanying drawings, in which.

Figure 1:
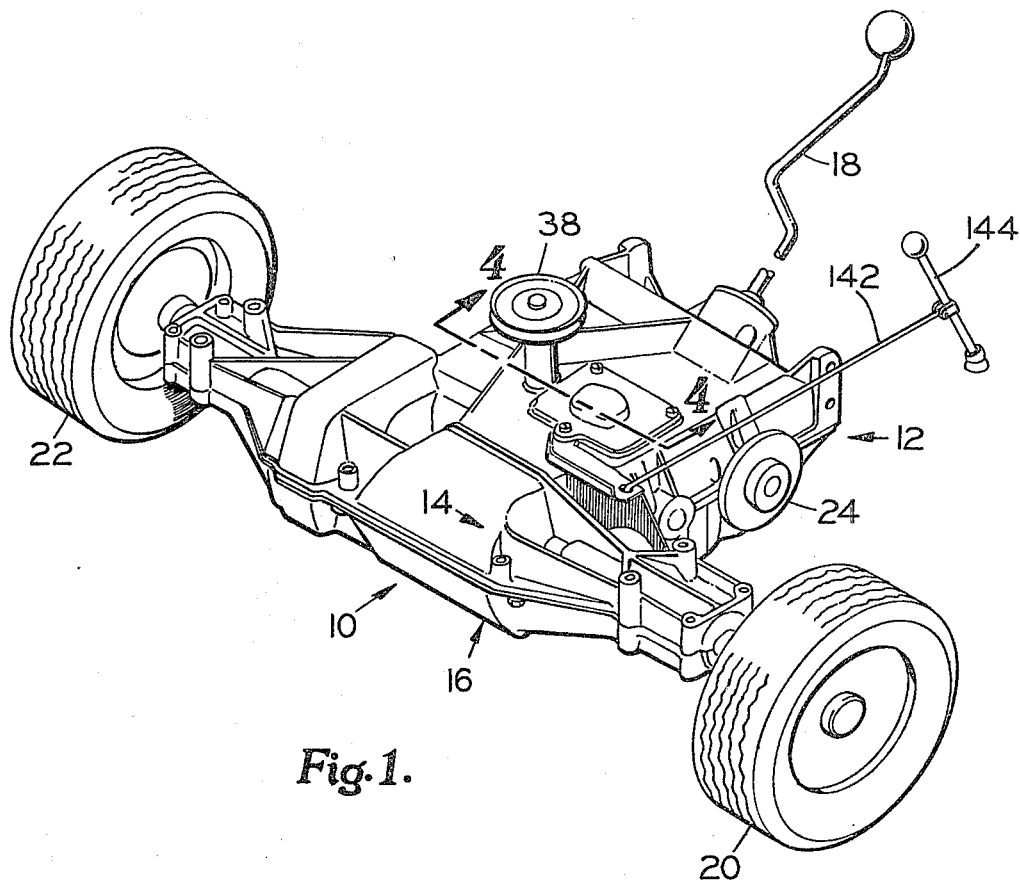
FIG. 1 is a rear view in perspective of a transaxle embodying the invention.

Referring particularly to FIG. 1, a transaxle incorporating the invention is indicated at 10 and is positioned as it would be if mounted on a small riding vehicle, such as a riding lawn mower or garden tractor, for example. The transaxle includes a generally horizontally disposed housing 12 having an upper housing half or part 14 and a lower housing half or part 16. The transmission is shallow with a forward gear shift lever 18 entering the housing near the level of the axes of rear wheels 20 and 22. The transaxle also is equipped with a disc brake 24 which is known in the art.

The transaxle includes a middle input shaft 26 (FIGS. 2 and 4), a forward, intermediate or shifting shaft 28 (FIG. 2), and rear output shafts or axles 30 and 32. The input shaft 26 is driven through a vertical drive shaft 34 (FIG. 4) having a drive bevel gear 36 and having an outer drive pulley 38 which can be suitably driven through a belt by an engine mounted forwardly on the vehicle. A driven bevel gear 40 is rotatably mounted on the input shaft 26 and has an integral spur gear 42 with recessed shift teeth 44. The outer periphery of the driven bevel gear 40 is backed up on the side opposite the teeth by a rib or flange 45. The rib supports the bevel gear 40 to maintain it in position on the input shaft 26 and also minimizes lateral deflection of the input shaft 26 when under load.

A high and low speed range selector shift dog 46 is keyed to the input shaft 26 and provides a high range of three forward speeds when shifted to the left position by external shifting mechanism to be discussed subsequently and engaged with the teeth 44 of the gear 42. The input shaft 26 then rotates with the driven bevel gear 40.

Figure 2:
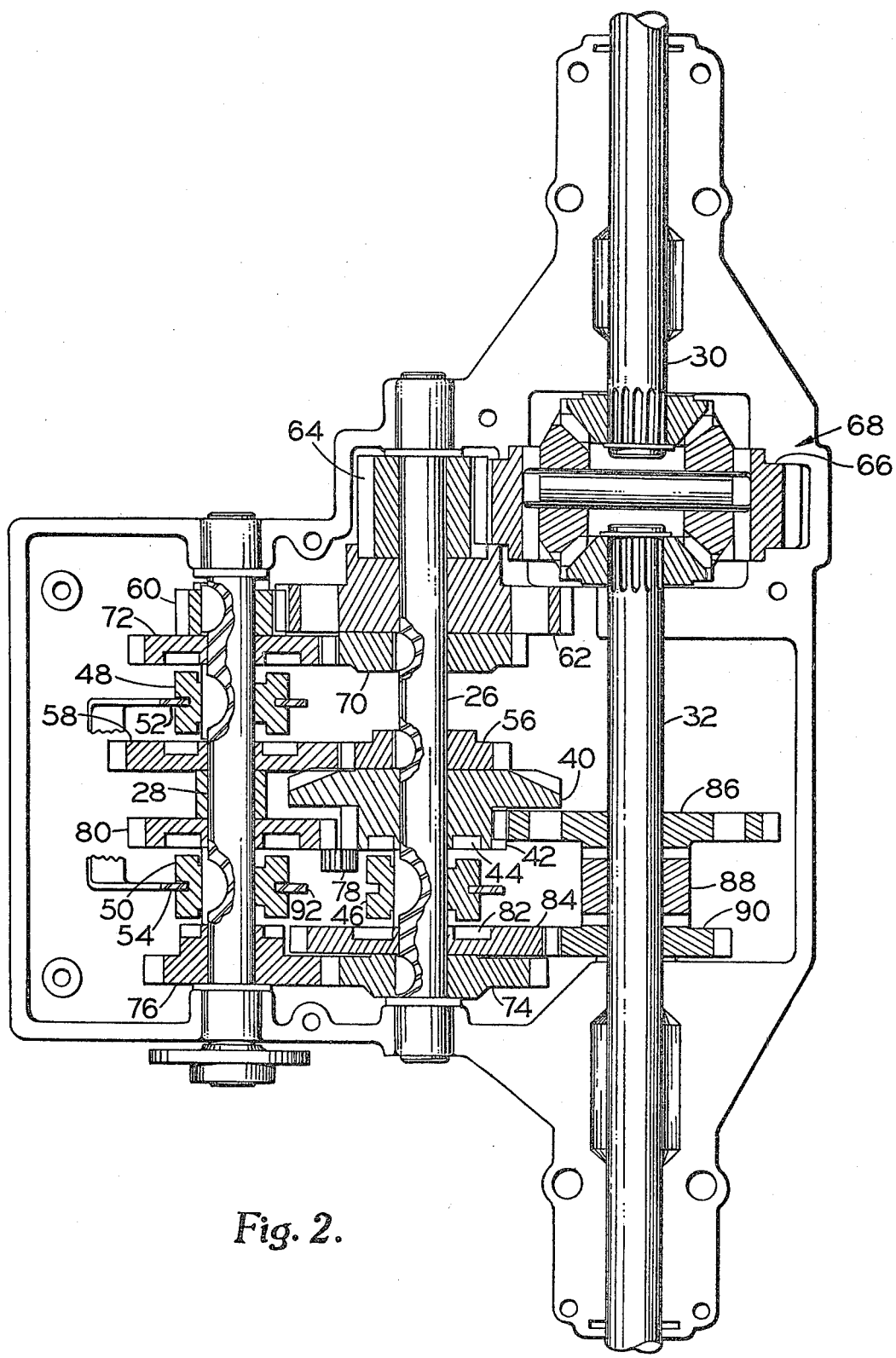
FIG. 2 is a bottom view of the transaxle of FIG. 1, with the lower housing half removed and with gears and other portions shown in section.
Figure 3:
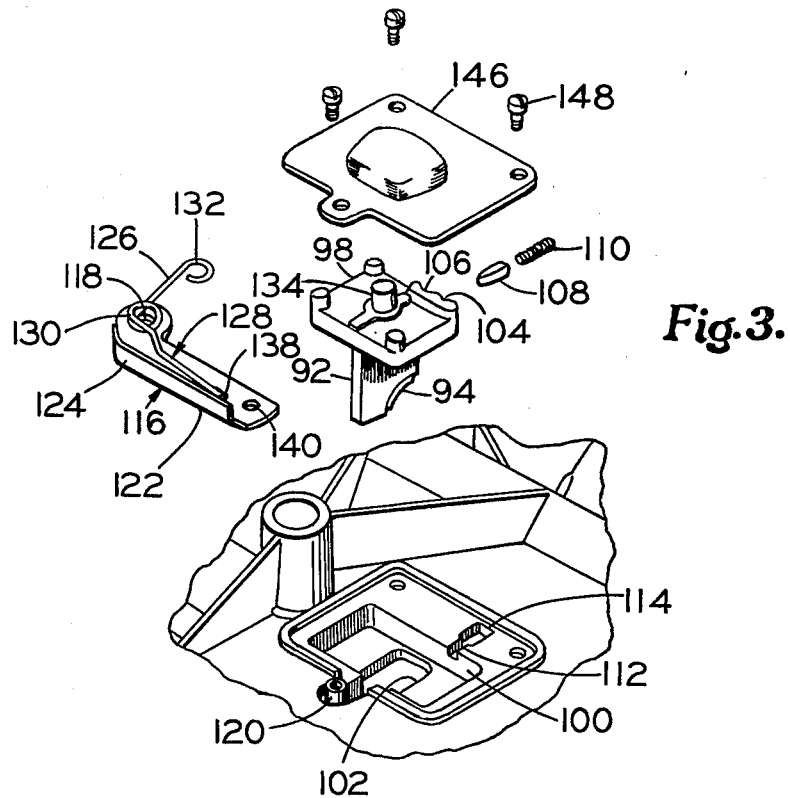
FIG. 3 is a fragmentary, exploded view in perspective of a shift arrangement for shifting between high and low ranges of forward speeds.

Referring to FIG. 2, two shift dogs 48 and 50 are keyed on the intermediate shaft 28 and are shifted back and forth by shifter forks 52 and 54. The shifter forks are shifted by the lever 18 when manipulated in an H-pattern through suitable mechanism such as that shown in Hauser U.S. Pat. No. 3,563,110, and will not be discussed in detail. When the shift dog 48 is moved to the left or down as viewed in FIG. 2, a first forward speed is provided through gears 56, 58, and 60. The latter meshes with a spur gear 62 which is rotatably mounted on the input shaft 26 and mechanically engages a spur gear 64 which is also rotatably mounted on the input shaft. The gear 64 then drives a main ring gear 66 of a differential 68.

A second forward speed is achieved when the shift dog 48 is moved to the right or up as viewed in FIG. 2. This is achieved through gears 70 and 72, along with the gears 60–66.

A third forward speed is achieved when the shift dog 48 is moved back to the middle, neutral position, as shown, and the dog 50 is moved to the left or down as viewed in FIG. 2. This is achieved through a gear train including gears 74 and 76 and the gears 60–66.

When the shift dog 50 is moved to the right or up as viewed in FIG. 2, a single reverse speed is achieved. This is accomplished through a gear train including the spur gear 42, an idler gear 78 which is rotatably carried by an ear of the upper housing part 14, and a spur gear 80. The gears 60–66 are then driven in reverse directions.

Figure 4:
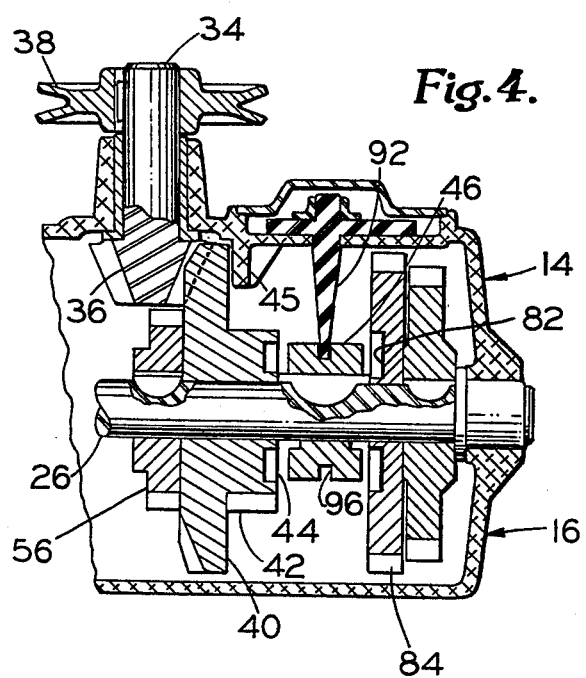
FIG. 4 is a fragmentary view in cross section taken along the line 4—4 of FIG. 1.

When the speed selector shift dog 46 is moved to the right position as viewed in FIG. 4, a low range of forward speeds is achieved. In this instance, the shift dog 46 has no middle or neutral position, even though it is shown in such a position in FIGS. 2 and 4. In the right-hand position, the dog 46 engages teeth 82 of a spur gear 84 on the input shaft 26 to cause the gear to rotate with the input shaft. With the dog 48 engaged with the gear 58, a low range, fourth forward speed is achieved when the spur gear 42 is rotated. This rotates a spur gear 86 which is rotatable on the output shaft or axle 32. The gear 86 is connected through a toothed sleeve 88 with a second spur gear 90 also rotatably mounted on the output shaft 32. The gear 90 then drives the spur gear 84 which rotates the input shaft 26 at a slower rate than when the input shaft was driven directly through the bevel gear 40 and the spur gear 42. The fourth forward speed is then achieved through the gears 56–66.

When the dog 48 is moved to engage the gear 72, a fifth forward speed is achieved through the gears 42, 86, 88, 90, 84, 70, 72, and 60–66.

When the dog 48 is in neutral and the dog 50 is moved to engage the gear 76, a sixth forward speed is achieved through the gears 42, 86, 88, 90, 84, 74, 76, and 60–66.

When the shift dog 50 is moved up to engage the gear 80, the same reverse speed is achieved as before, through the spur gear 42, the idler 78, the gear 80, and the gears 60–66.

The shift mechanism for the high and low speed shift dog 46 is shown more particularly in FIGS. 3-6. A shifter fork 92 has a lower arcuate ridge 94 extending into a narrow annular groove 96 in the dog 46. The shifter fork 92 also has an upper slide 98 located in a shallow recess 100 cast in the upper housing part 14 when the shifter fork 92 extends through an opening 102 in this housing part. The slide 98 has two notches 104 and 106 therein which receive a detent 108 urged toward the notches by a spring 110. The detent is located in a groove 112 in the housing part 14 and the spring 110 is located in a recess 114 behind the groove. When the shifter fork 92 is in the high speed range position and the dog 46 is engaged with the spur gear 42, the detent 108 projects into the notch 104 of the slide 98. When the shifter fork 92 is in the low speed range position with the shift dog 46 engaged with the spur gear 84, the detent 108 is in the notch 106.

For moving the shifter fork 92 and the slide 98 between the two positions, a generally L-shaped resilient shift lever 116 is provided. The lever 116 has an opening 118 which is pivotally received on a post 120 of the upper housing part 14. The lever 116 includes a rigid leg 112 with a reinforcing flange 124 extending therefrom and a resilient leg 126. The resilient leg 126 is formed by a spring 128 having an intermediate portion 130 in the shape of a coil which is received over the post 120. The outer end of the spring 128 also has a portion 132 which is coiled and received on a post 134 extending upwardly from the slide 98. The other end of the spring 128 has an offset 136 which is received in an intermediate opening 138 in the rigid leg 122 of the shift lever 116. The rigid leg 122 also has an outer end opening 140 by means of which the shift lever 116 is shifted. A shift rod 142 (FIG. 1) is pivotally engaged in the opening 140 and is longitudinally moved by a suitable shift handle 144 to push and pull the shift lever 116. A suitable cover 146 is located over part of the shift lever and the slide 98, being fastened by screws 148.

Figures 5, 6:
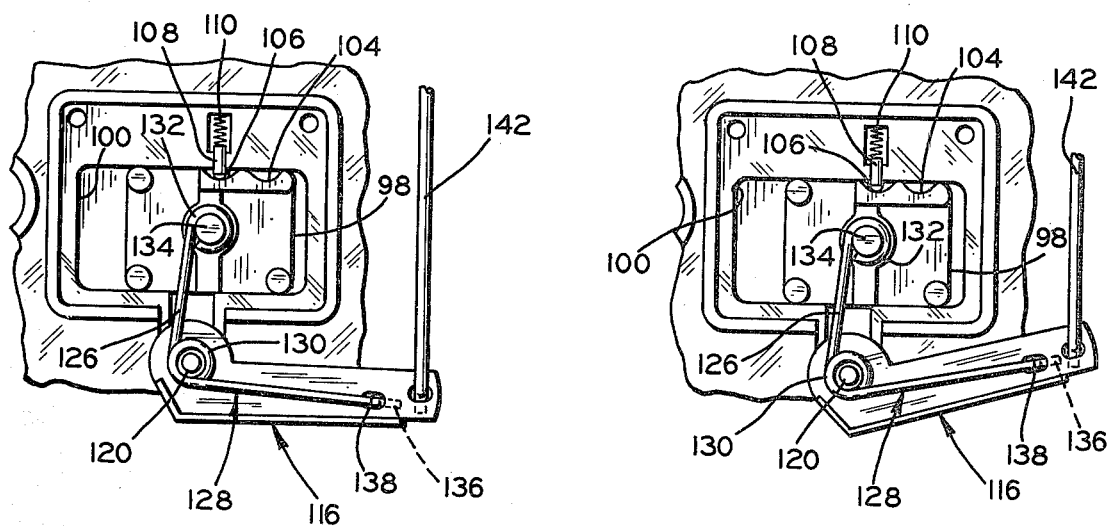
FIGS. 5 and 6 are plan views of certain shift components of FIG. 3 in different positions.

In the operation of the shift mechanism, if the shift rod 142 is pushed or pulled to move the lever 116 and the shifter fork 92 from one engaged position of the shift dog 46 to the other, under most operating conditions, the shift will be effected. However, if the transaxle is under an unusually heavy load and there is relatively high torque transmitted from the dog 46 to either of the gears 40 or 84, then the push or pull force applied to the shift lever 116 by the shift rod 142 will simply cause the resilient leg 126 of the shift lever 116 to yield and the slide 98, the shifter fork 92, and the dog 46 will remain in the engaged position (FIG. 6). Once the load is reduced and the high torque diminished, then the resilient leg 126 of the shift lever 116, being under stress, will automatically move the dog 46 to the other engaged position. Hence, no excessive stress will be applied to any of the components which can otherwise cause the shifter fork 92 to be distorted or permanently bent or broken or cause other damage. The resilient and rigid legs of the lever 116 could be reversed, if desired.

If the teeth of the shift dog 46 and the teeth 44 or 82 of the gear 42 or 84 are tapered at an angle, disengagement can be accomplished with considerably less force. However, such tapering of the teeth results in much faster wear thereof.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. In combination, a shaft, a gear rotatably mounted on said shaft, a shift dog mounted on said shaft for rotation therewith, said shift dog being movable along said shaft between a position engaged with said gear and a position not engaged with said gear, a shifter fork engagable with said shift dog to move said shift dog between its two positions when said shifter fork is moved between two positions, and a resilient shift lever pivoted for movement between two positions for moving said shifter fork between its two positions, said shift lever having a rigid leg extending outwardly in one direction from the pivot and a resilient leg extending outwardly in another direction from the pivot, remotely-controlled means pivotally engaged with an end portion of said rigid leg for moving said rigid leg, said resilient leg being an elongate spring having a portion extending outwardly from the pivot and connected to said shifter fork and having another portion extending from the pivot along said rigid leg and connected to said rigid leg between said pivot and the end portion of said rigid leg connected to said remotely-controlled means.

2. The combination according to claim 1 characterized by said shifter fork having an outwardly-extending projection, and said elongate frame having a coil extending around said pivot and having an end loop extending around said shifter fork projection.

3. The combination according to claim 1 characterized by said additional portion of said spring having an offset therein, and said rigid leg having an opening between said pivot and said end portion receiving said offset.

4. In a transaxle or the like, a shaft, a first gear rotatably mounted on said shaft, a second gear rotatably mounted on said shaft and spaced from said first gear, a shift dog mounted on said shaft for rotation therewith, said shift dog being movable along said shaft between a position engaged with said first gear and a position engaged with said second gear, additional gear means meshing with said first gear, additional gear means meshing with said second gear, shift means engagable with said shift dog for moving said shift dog along said shaft, said shift means having an outwardly-extending projection, a resilient shift lever having two positions for moving said shift means, said shift lever yielding when moved to move said shift dog from one of its positions to the other of its positions and the first or second gear with which said dog is engaged is producing sufficient torque with the respective additional gear means to resist disengagement of said shift dog, whereby said shift lever moves to the other position while said shift dog remains in the same engaged position, said shift lever having a rigid leg and a resilient leg, a housing, pivot means on said housing pivotally mounting said rigid leg thereon, said resilient leg being an elongate rod-like spring having a structurally-integral coil extending around said pivot means and a structurally-integral loop engaging said shift means projection, with the portion of said spring between said coil and said loop being substantially straight.

5. In a transaxle or the like, a shaft, a first gear rotatably mounted on said shaft, a second gear rotatably mounted on said shaft and spaced from said first gear, a shift dog mounted on said shaft for rotation therewith, said shift dog being movable along said shaft between a position engaged with said first gear and a position engaged with said second gear, additional gear means meshing with said first gear, additional gear means meshing with said second gear, shift means engagable with said shift dog for moving said shift dog along said shaft, said shift means having an outwardly-extending projection, a generally L-shaped resilient shift lever having two positions for moving said shift means, said shift lever yielding when moved to move said shift dog from one of its positions to the other of its positions and the first or second gear with which said dog is engaged is producing sufficient torque with the respective additional gear means to resist disengagement of said shift dog, whereby said shift lever moves to the other position while said shift dog remains in the same engaged position, said shift lever having a rigid leg and a resilient leg, a housing, pivot means on said housing pivotally mounting said rigid leg thereon, said rigid leg extending outwardly in one direction from the pivot and said resilient leg extending outwardly in another direction from the pivot, said resilient leg being an elongate rod-like spring having a first portion pivotally mounted on said pivot means and a second portion connected to said shift means, with a portion of said spring between said first portion and said second portion being substantially straight, said spring having an additional portion extending outwardly from said pivot means at an angle to the substantially straight portion of said spring, said additional portion being generally parallel to said rigid leg and connected to said rigid leg, whereby said additional portion can move with said rigid leg for any pivotal movement thereof between the two positions of said shift lever.

* * * * *